United States Patent
Furukawa et al.

(10) Patent No.: US 7,804,479 B2
(45) Date of Patent: Sep. 28, 2010

(54) DISPLAY DEVICE WITH A TOUCH SCREEN

(75) Inventors: Takehide Furukawa, Yokohama (JP);
Naruhiko Kasai, Yokohama (JP);
Hajime Akimoto, Kokubunji (JP)

(73) Assignee: Hitachi Displays, Ltd., Chiba (JP)

( * ) Notice: Subject to any disclaimer, the term of this patent is extended or adjusted under 35 U.S.C. 154(b) by 1123 days.

(21) Appl. No.: 11/401,930

(22) Filed: Apr. 12, 2006

(65) Prior Publication Data

US 2006/0256093 A1  Nov. 16, 2006

(30) Foreign Application Priority Data

May 12, 2005 (JP) ............................. 2005-139754

(51) Int. Cl.
*G09G 3/36* (2006.01)
(52) U.S. Cl. .................... 345/102; 345/204; 345/55
(58) Field of Classification Search ............. 345/102, 345/55, 204
See application file for complete search history.

(56) References Cited

U.S. PATENT DOCUMENTS 6,252,572 B1 * 6/2001 Kurumisawa et al. ........ 345/98
2003/0189211 A1 * 10/2003 Dietz ............................ 257/79
2005/0146654 A1 * 7/2005 Tseng ........................... 349/69
2006/0007209 A1 * 1/2006 Nakamura et al. .......... 345/204
2006/0139320 A1 * 6/2006 Lang .......................... 345/156
2008/0062343 A1 * 3/2008 Boer et al. .................... 349/42

FOREIGN PATENT DOCUMENTS

EP    1610210    12/2005

OTHER PUBLICATIONS

"Active Matrix LCD with integrated Optical Touch Screen", SID' 03 Digest.

* cited by examiner

*Primary Examiner*—Richard Hjerpe
*Assistant Examiner*—Leonid Shapiro
(74) *Attorney, Agent, or Firm*—Antonelli, Terry, Stout & Kraus, LLP.

(57) ABSTRACT

A display device with a touch screen having display pixels and optical sensors each arranged in a matrix. In the display device, a backlight controller controls a backlight unit to be turned ON in a data display duration and controls the backlight unit to be turned OFF in a sensor detection duration other than the data display duration. Consequently, the influence of backlight on a touch part when the shade of the touch part is to be detected, can be reduced and an accuracy in the detection of an optical sensor can be increased.

1 Claim, 8 Drawing Sheets

DISPLAY DEVICE WITH A TOUCH SCREEN

INCORPORATION BY REFERENCE

The present application claims priority from Japanese application JP2005-139754 filed on May 12, 2005, the content of which is hereby incorporated by reference into this application.

BACKGROUND OF THE INVENTION

The present invention relates to a display device with a touch screen having sensors arranged in a matrix which illuminates a liquid crystal display panel by a backlight light source or displays an image by spontaneous light-emitting elements, and more particularly, to control of backlight to realize an increased detection accuracy in the sensors or control of the spontaneous light-emitting elements.

Recent years have seen significant spread of a display panel which can be operated by touching the panel with use of a pen or operator's finger. As one of touch operation detecting systems, a system for building optical sensors into a liquid crystal display panel is enumerated. There is disclosed in SID'03 Digest "Active Matrix LCD with Integrated Optical Touch Screen" an LCD wherein, when an operator touches a panel with use of his finger or a stylus pen, a shade is produced on the display panel at its touched site by blocking external light coming into the display panel from its surface.

Also disclosed in EP 1 610 210 A1 (JP-A-2004-318819) is a display device which eliminates the influences of external light causing noise by utilizing a backlight light source when a touch operation by finger is detected.

SUMMARY OF THE INVENTION

When the output of a sensor is scanned, the sensor receives not only external light but also backlight from its rear surface or light emitted from spontaneous light-emitting elements. This affects the light detection accuracy of the sensor.

It is therefore an object of the present invention is to provide a display device which, in a sensor output scan mode, can turn OFF backlight or can give black display of a panel to thereby reduce the influence of backlight or light from spontaneous light-emitting elements on a sensor part.

In the display device with a touch screen having optical sensors built therein for detecting a shade produced when external light coming into a liquid crystal display panel from its surface is shielded, a touch detection accuracy can be increased. Since the external light is utilized and no separate illumination light source is used, a power consumption can be suppressed in order to detect a touch.

Therefore, the present invention is suitably employed for a liquid crystal display device utilizing backlight light source such as cellular phone, PDA or television; or is suitably employed for a liquid crystal display device utilizing spontaneous light-emitting elements such as organic ELs.

Other objects, features and advantages of the invention will become apparent from the following description of the embodiments of the invention taken in conjunction with the accompanying drawings.

DESCRIPTION OF THE EMBODIMENTS

Embodiment 1

Figure 1:
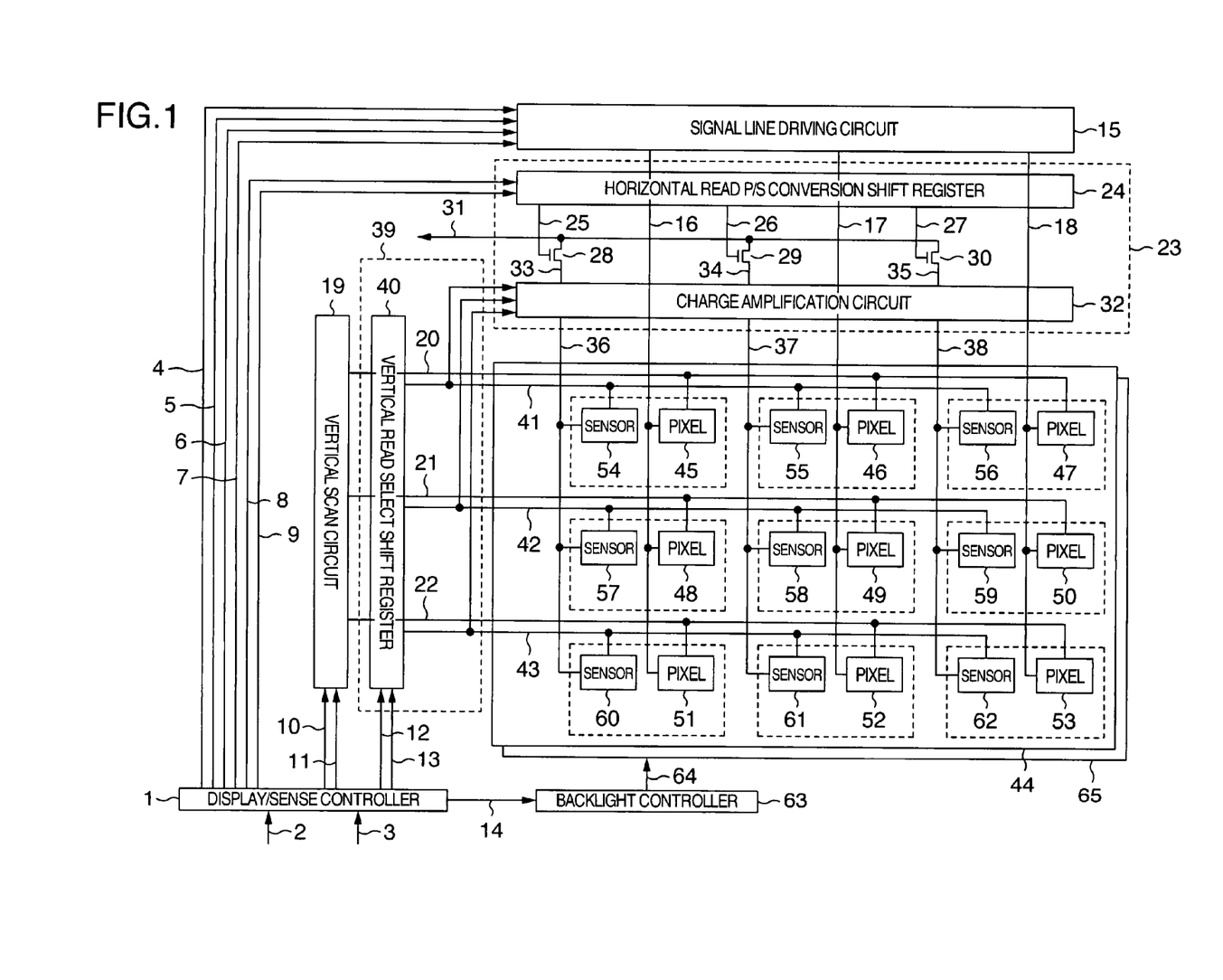
FIG. 1 schematically shows a display device with a touch screen in accordance with a first embodiment of the present invention.

FIG. 1 schematically shows a display device with a touch screen in accordance with an embodiment of the present invention, wherein reference numeral 1 denotes a display/sense controller, numeral 2 denotes input display data, 3 denotes an input sync signal, 4 display data, 5 a horizontal start pulse, 6 a horizontal shift clock, 7 a horizontal latch clock, 8 a sense read start pulse, 9 a sense read shift clock, 10 a vertical start pulse, 11 a vertical shift clock, 12 a sense line select start pulse, 13 a sense line select shift clock, 14 a sense sync backlight control signal.

The display/sense controller 1, according to the input display data 2 and the input sync signal 3, generates the display data 4, the horizontal start pulse 5 indicative of start of one horizontal period, the horizontal shift clock 6 for shifting the horizontal start pulse sequentially in the horizontal direction, the horizontal latch clock 7 indicative of timing of collective output of display data corresponding to one horizon, the vertical start pulse 10 indicative of start of one vertical period, and the vertical shift clock 11 for shifting the vertical start pulse sequentially to the vertical direction, as in the prior art; and outputs these data, pulses, and clocks to a signal line driving circuit 15.

The display/sense controller 1 also generates the sense read start pulse 8 for starting the output read of a sense result of an optical sensor, the sense read shift clock 9 for shifting a read position sequentially to the horizontal direction, the sense line select start pulse 12 for starting the selection of a sense line to output the sense output thereto, and the sense line select shift clock 13 for shifting the selection of the sense line sequentially to the vertical direction.

The display/sense controller 1 also generates the sense sync backlight control signal 14 for controlling backlight in an light sense mode.

Reference numeral 15 denotes a signal line driving circuit already mentioned above, numeral 16 denotes a first X signal line, 17 denotes a second X signal line, 18 a 240-th X signal line. The signal line driving circuit 15, as in the prior art, sequentially receives the display data 4 according to the horizontal start pulse 5 and the horizontal shift clock 6, and outputs the display data corresponding to one line according to the horizontal latch clock 7. In the present embodiment, explanation will be made in the following, assuming that 240 of the X signal lines are provided in the horizontal direction.

Reference numeral 19 denotes a vertical scan circuit, numeral 20 denotes a first Y scan line, 21 denotes a second Y scan line, 22 a 320-th Y scan line. The vertical scan circuit 19, as in the prior art, outputs a pulse to sequentially shift the vertical start pulse 12 to the vertical direction according to the vertical shift clock 13 and to sequentially select the first to 320-th Y scan line 20 to 22.

Reference numeral 23 denotes an X directional sensor detection circuit, numeral 24 denotes a horizontal read P/S (parallel/serial) conversion shift register, 25 denotes a first X sensor line select signal, 26 a second X sensor line select signal, 27 a 240-th X sensor select signal, 28 a first X sensor line select switch, 29 a second X sensor line select switch, 30 a 240-th X sensor line select switch, 31 an X directional sensor output, 32 an X sensor charge amplification circuit, 33 a first X sensor line output, 34 a second X sensor line output, 35 a 240-th X sensor line output, 36 a first X sensor line, 37 a second X sensor line, 38 a 240-th X sensor line.

The X directional sensor detection circuit 23 includes the horizontal read P/S conversion shift register 24, the first to 240-th X sensor line select switches 28 to 30, and the charge amplification circuit 32.

The horizontal read P/S conversion shift register 24 sequentially shifts the sense read start pulse 8 according to the sense read shift clock 9, and outputs the first, second and 240-th X sensor line select signals 25, 26, and 27.

The charge amplification circuit 32 amplifies changes in the outputs of the first to 240-th X sensor lines 36 to 38 when light hits the optical sensor; and outputs the first, second and 240-th X sensor line outputs 33, 34, and 35.

The first X sensor line select switch 28, the second X sensor line select switch 29, and the 240-th X sensor line select switch 30 select the first to 240-th X sensor line outputs 33 to 35 according to the first, second, and the 240-th X sensor line select signals 25, 26, and 27 respectively; convert the parallel signals to a serial signal; and output it as the X directional sensor output 31.

Reference numeral 39 denotes a Y direction sensor detection circuit, numeral 40 denotes a vertical read select shift register, 41 denotes a first Y sensor select line, 42 a second Y sensor select line, 43 a 320-th Y sensor select line. The Y direction sensor detection circuit 39 is made up of only the vertical read select shift register 40 unlike the shift register for the X direction.

The vertical read select shift register 40 sequentially shifts the sense line select start pulse 12 to the vertical direction according to the sense line select shift clock 13; and outputs the first, second, and 320-th Y sensor select lines 41, 42, and 43.

Reference numeral 44 denotes an optical sensor built-in display circuit, numeral 45 denotes an X1Y1 display pixel, 46 an X2Y1 display pixel, 47 an X240Y1 display pixel, 48 an X1Y2 display pixel, 49 an X2Y2 display pixel, 50 an X240Y2 display pixel, 51 an X1Y320 display pixel, 52 an X2Y320 display pixel, 53 an X240Y320 display pixel, 54 an X1Y1 sensor, 55 an X2Y1 sensor, 56 an X240Y1 sensor, 57 an X1Y2 sensor, 58 an X2Y2 sensor, 59 an X240Y2 sensor, 60 an X1Y320 sensor, 61 an X2Y320 sensor, 62 an X240Y320 sensor.

The optical sensor built-in display circuit 44, as in the prior art, gives display of the X1Y1 to X240Y320 display pixels 45 to 53, and detects external light coming into the display panel from its surface with use of the X1Y1 to X240Y320 sensors 54 to 62.

At this time, sensor light detection results on the scan line selected by the first to 320-th Y sensor select lines 41 to 43 are output parallelly to the first to 240-th X sensor line 36 to 38.

Reference numeral 63 denotes a backlight controller, numeral 64 denotes a backlight turn-ON control signal, and 65 denotes a backlight unit. The backlight controller 63 generates the backlight turn-ON control signal 64 according to the sense sync backlight control signal 14 to control the turning ON of the backlight unit in a sense operational mode.

Explanation will now be made on the assumption that the sense sync backlight control signal 14 controls the backlight unit in such a manner that the backlight unit is turned OFF in a sense period during which the sensor detects light. The backlight unit 65 is turned ON or OFF according to the backlight turn-ON control signal 64.

Figure 2:
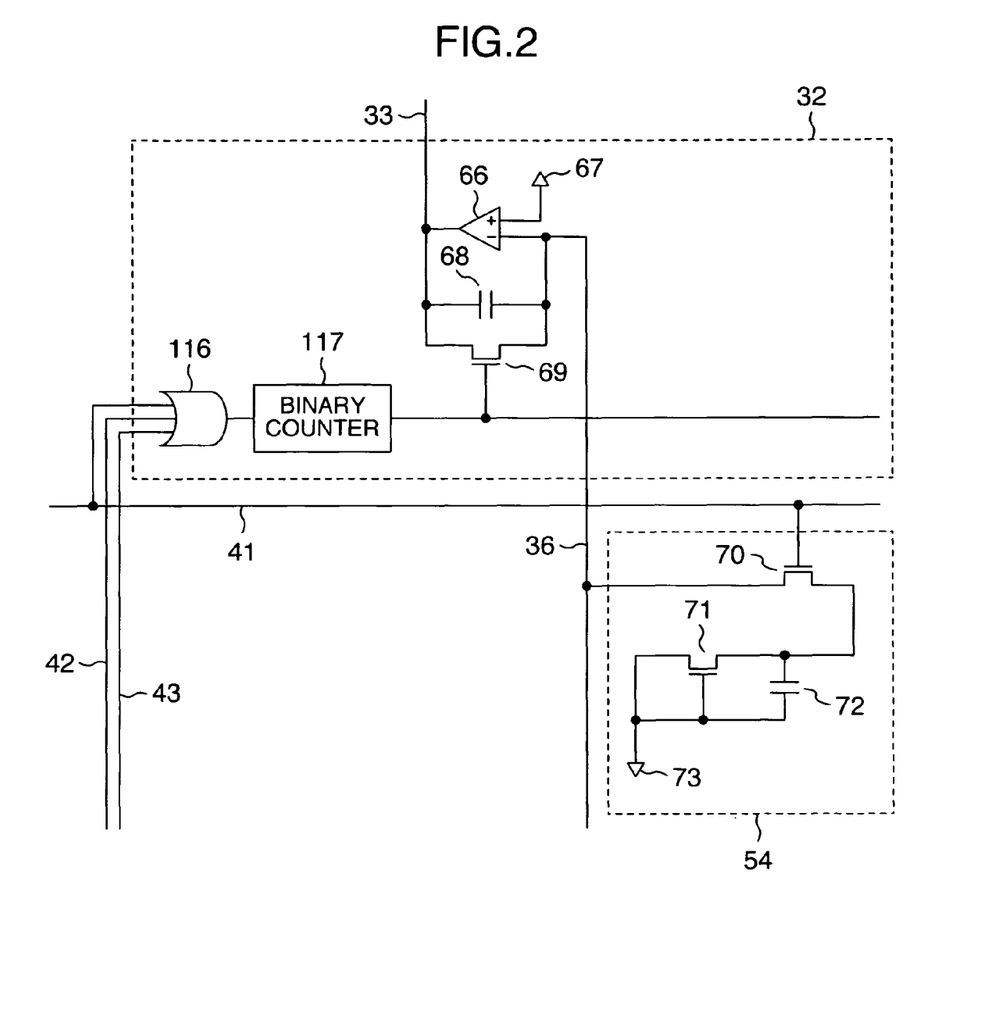
FIG. 2 shows an internal structure of an X1Y1 sensor 54 in sensors 54 to 62 shown in FIG. 1 and also an internal structure of a charge amplification circuit 32 connected thereto.

FIG. 2 shows, as an example, an internal structure of the X1Y1 sensor 54 in the sensors 54 to 62 shown in FIG. 1 and an internal structure of the charge amplification circuit 32 connected thereto. The X2Y1 to X240Y320 sensors 55 to 62 have substantially the same structure, which is substantially the same as in the prior art shown in the SID'03 Digest "Active Matrix LCD with Integrated Optical Touch Screen".

In FIG. 2, reference numeral 66 denotes a charge amplifier, numeral 67 denotes an amplifier reference power source, 68 denotes a feedback capacitance, 69 a sensor line reset switch, 70 a read select switch, 71 a phototransistor, 72 a storage capacitance, 73 a phototransistor bias power source.

The phototransistor 71 is diode-connected so that, in response to received light, an electric charge accumulated in the storage capacitance 72 flows as a leakage current in a reverse direction (toward the phototransistor bias power source).

In the SID'03 Digest "Active Matrix LCD with Integrated Optical Touch Screen", there is a description that, when the operator fails to touch the display screen (in a no touch mode), external light hits the phototransistor 71 and a current flows; while, when the operator touches the display screen, light fails to hit the phototransistor 71 and no current flows. Explanation will then be made according to the above description. And explanation will also be made on the assumption that the amplifier reference power source 67 has a voltage $V_{ref}$ (V) and the phototransistor bias power source 73 has a voltage $V_{bias}$ (V).

When the first Y sensor select line 41 is selected, the read select switch 70 is in its ON state, and the sensor line reset switch 69 is in its ON state; the storage capacitance 72 is charged with an electric charge, and the electric charge has a potential of $V_{ref}$-$V_{bias}$ (V) corresponding to a difference between the amplifier reference power source 67 and the phototransistor bias power source 73. At this time, the storage capacitance 72 is charged with an electric charge $Q_{sat}$ expressed by the following equation (1).

$$Q_{Sat} = C_{st}(V_{ref} - V_{bias}) \quad (1)$$

When the read select switch 70 is in the OFF state, next, the sensor line reset switch 69 is in the OFF state, and a reset release state is established. The flowing of the current through the phototransistor 71 in the no touch mode causes the electric charge $Q_{sat}$ charged in the storage capacitance 72 to be discharged by an amount $\Delta Q$ expressed by the following equation (2).

$$\Delta Q = \int_{t_0}^{t_0+T_f} I_{ph}(t)dt \quad (2)$$

Assume now that $I_{ph}$ denotes a light current flowing when light hits the phototransistor 71, to denotes a reset time, and $T_f$ denotes a duration until read operation (in the following explanation of this example, one vertical period (one frame)).

When the read select switch 70 is again put in the ON state after one vertical period, a current corresponding to the discharged electric charge $\Delta Q$ flows through the feedback capacitance 68. This causes the charge amplifier 66 to output a voltage value $V_{out}$ expressed by the following equation (3).

$$V_{out} = \Delta Q / C_{fb} = \int_{t_0}^{t_0+T_f} I_{ph}(t) dt / C_{fb} \quad (3)$$

In a touch mode, since no current flows, the electric charge accumulated in the storage capacitance 72 is held. In this case, an output voltage has a value $V_{outmax}$ expressed by the following equation (4) corresponding to the $Q_{sat}$.

$$V_{outmax} = C_{st}(V_{ref} - V_{bias}) / C_{fb} \quad (4)$$

The voltage value expressed by the equation (3) or (4) is output as the first X sensor line output 33. All the sensors positioned on the same horizontal line perform substantially the same operation. When the above selected select line is sequentially shifted in the vertical direction, all sensor lines (320 lines in the present embodiment) are read out in one vertical period.

Reference numeral 116 denotes a multi-input OR circuit and reference 117 denotes a binary counter. Assume that the binary counter 117 outputs "1" for the first pulse and "0" for the second pulse.

Figure 3:
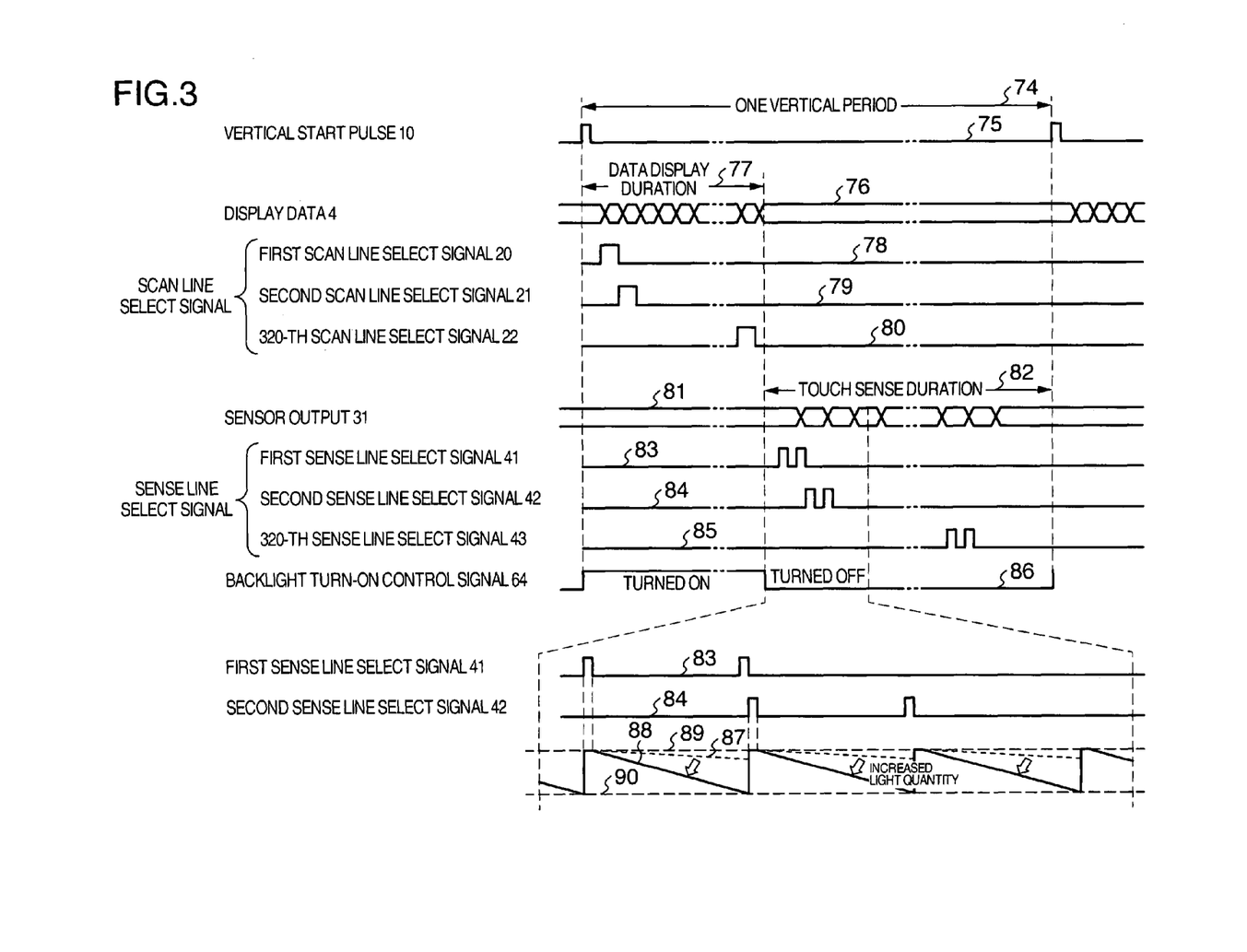
FIG. 3 is a timing chart showing the operations of control signals shown in FIG. 1.

FIG. 3 is a timing chart showing the operations of control signals. In the drawing, reference numeral 74 denotes one vertical period, numeral 75 denotes a waveform of the vertical start pulse 10, 76 denotes a waveform of the display data 4, 77 a data display duration, 78 a waveform of the first scan line select signal 20, 79 a waveform of the second scan line select signal 21, 80 a waveform of the 320-th scan line select signal 22, 81 a waveform of the sense output 31, 82 a touch sense duration, 83 a waveform of the first sense line select signal 41, 84 a waveform of the second sense line select signal 42, 85 a waveform of the 320-th sense line select signal 43, 86 a waveform of the backlight turn-ON control signal 64, 87 touch-time voltage waveform, 88 a nontouch-time voltage waveform, 89 a reset-time voltage level, 90 a phototransistor bias source voltage level.

One vertical period 74 corresponds to one period of the vertical start pulse waveform 75. The waveform 76 indicates that display data is input during the data display duration 77 and a select pulse is sequentially output in the first to 320-th scan line select signal waveforms 78 to 80.

The sense output waveform 81 indicates that a sense output is issued in the touch sense duration 82 corresponding to a part of the one vertical period 74 other than the data display duration 77, and select pulses are sequentially output in the first to 320-th sense line select signal waveforms 83 to 85.

The backlight turn-ON control signal waveform 86 is controlled to be turned OFF in the touch sense duration 82.

Figure 4A:
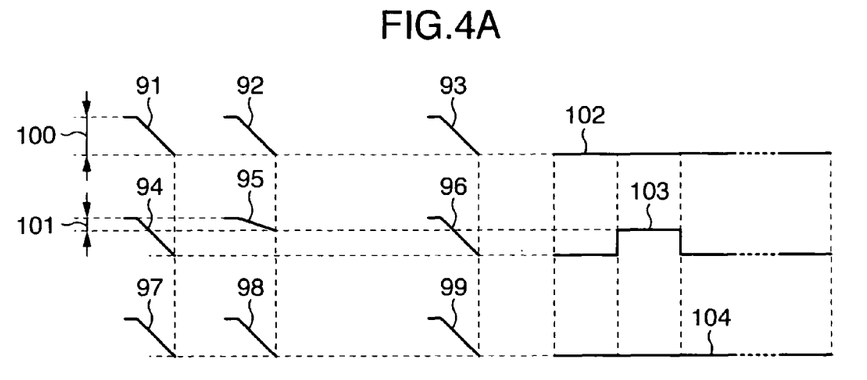
FIG. 4A shows an example of changes in voltages of X sensor line outputs 33 to 35 shown in FIG. 1.
Figure 4B:
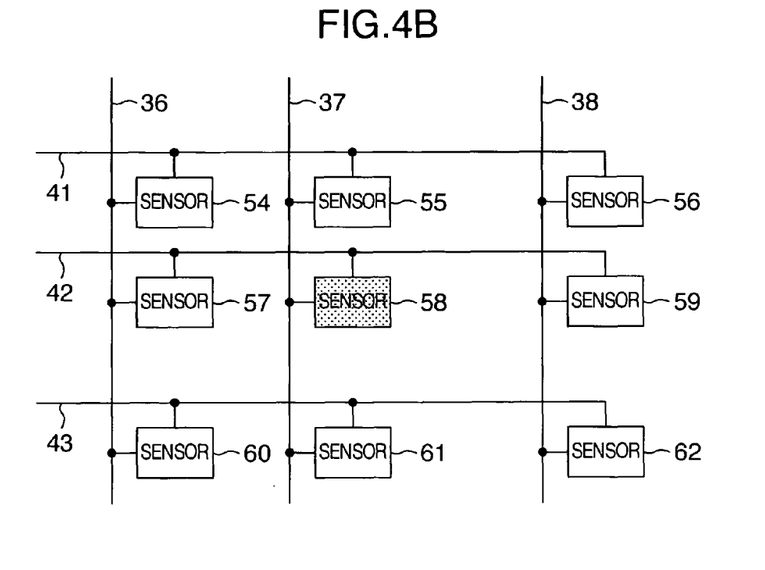
FIG. 4B shows the state in which the X2Y2 sensor 58 (shaded part) is touched.

FIG. 4A shows an example of voltage changes in the X sensor line outputs 33 to 35 shown in FIG. 1, and FIG. 4B shows the state in which the X2Y2 sensor 58 (shaded part) is touched.

In FIG. 4A, reference numeral 91 denotes a waveform of the X1 sensor line when Y1 is selected, numeral 92 denotes a waveform of the X2 sensor line when Y1 is selected, 93 denotes a waveform of the X240 sensor line when Y1 is selected, 94 a waveform of the X1 sensor line when Y2 is selected, 95 a waveform of the X2 sensor line when Y2 is selected, 96 a waveform of the X240 sensor line when Y2 is selected, 97 a waveform of the X1 sensor line when Y320 is selected, 98 a waveform of the X2 sensor line when Y320 is selected, 99 a waveform of the X240 sensor line when Y320 is selected, 100 a nontouch-time voltage change, 101 a touch-time voltage change, 102 a waveform of the sensor output on the first Y select line, 103 a waveform of the sensor output on the second Y select line, 104 a waveform of the sensor output on the 320-th Y select line.

The voltage change of the Y1 select-time X1 sensor line waveform 91 in a no touch mode is large. Similarly, the voltage changes of the Y1 select-time X2 sensor line waveform 92, Y1 select-time X240 sensor line waveform 93, Y2 select-time X1 sensor line waveform 94, Y2 select-time X240 sensor line waveform 96, Y320 select-time X2 sensor line waveform 98, and Y320 select-time X240 sensor line waveform 99 are also large. Those changes become the nontouch-time voltage change 100.

Since a voltage change in the Y2 select-time X2 sensor line waveform 95 is small because of no light reception in the touch mode, the voltage change becomes only the touch-time voltage change 101.

The first Y select line sensor output waveform 102 shows the serial output of the voltage change correspondent to the Y1 select-time X1 sensor line waveform 91, the voltage change correspondent to the Y1 select-time X2 sensor line waveform 92, and the voltage change correspondent to the Y1 select-time X240 sensor line 93. Similarly, the second Y select line sensor output waveform 103 shows the serial output of the voltage change correspondent to the Y1 select-time X1 sensor line waveform 91, the voltage change correspondent to the Y1 select-time X2 sensor line waveform 92, and the voltage change correspondent to the Y1 select-time X240 sensor line 93.

Figure 5:
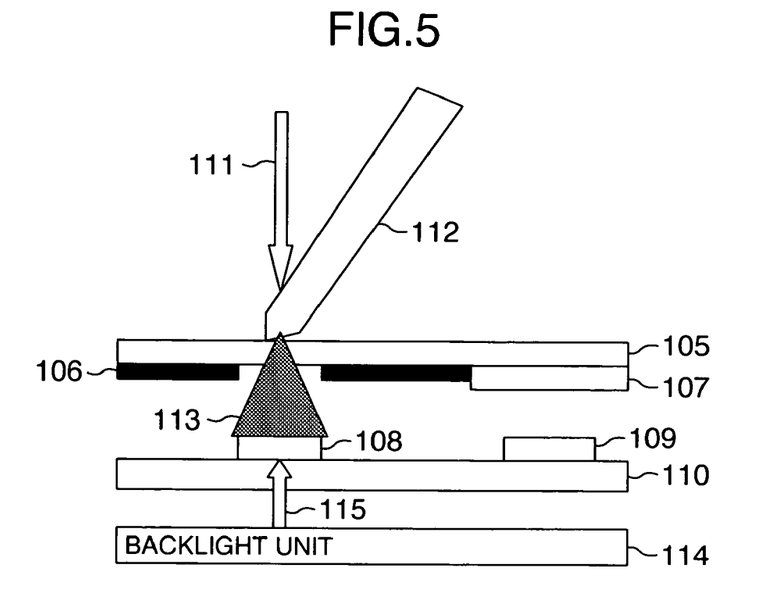
FIG. 5 shows the state of data display duration in a touch mode.

FIG. 5 shows a condition of a data display duration in a touch mode. In the drawing, reference numeral 105 denotes an upper glass substrate, numeral 106 denotes a black matrix, 107 denotes a color filter, 108 a photo sensor, 109 a pixel transistor, 110 a lower glass substrate. A display unit including X signal lines and Y scan lines as well as the photo sensor 108 as a sensor are arranged on the lower glass substrate 110, which has substantially the same structure as a prior art liquid crystal display panel.

Reference numeral 111 denotes external light, numeral 112 denotes a stylus pen, and 113 denotes a shade. The photo sensor 108 detects a difference between the shade 113 when the panel is touched with the stylus pen 112, operator's finger or the like and the external light 111 coming into the panel when not touched.

Reference numeral 115 denotes backlight. Even when the photo sensor 108 receives the shade, the backlight hits the photo sensor.

Figure 6:
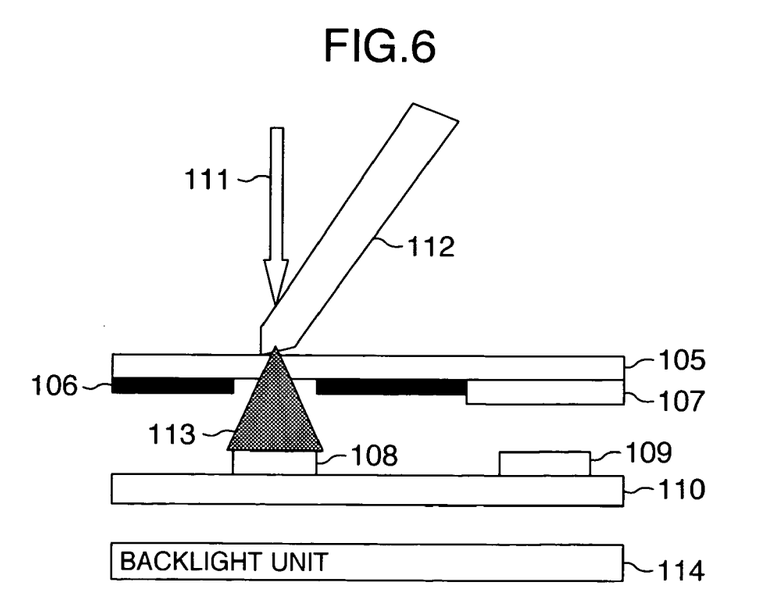
FIG. 6 shows the state of sense duration in the touch mode.

FIG. 6 shows a condition of a sense duration in a touch mode. The structure of FIG. 6 is the same as that of FIG. 5, but different in that, when the backlight is turned OFF in the sense duration, the shaped photo sensor 108 fails to receive the backlight.

Explanation will be made as to how to control backlight of the display device with a touch screen in accordance with the present embodiment, by referring to FIGS. 1 to 6.

A flow of display image sensor line output scan and backlight control will be explained with reference to FIGS. 1, 2, 3, 4A, and 4B. The displaying operation of the display unit is substantially the same as in the prior art, like the data display duration shown in FIG. 3.

When the sense line select start pulse 12 is first input to the vertical read select shift register 40 in FIG. 1, one of the Y sensor select lines is sequentially selected according to the sense line select shift clock 13 as shown in FIG. 3, so that outputs of the first, second, and 240-th X sensor lines 36, 37, and 38 on the selected line are output to the charge amplification circuit 32, which in turn outputs these outputs as the first, second and 240-th X sensor line outputs 33, 34, and 35.

The horizontal read P/S conversion shift register 24 then sequentially shifts and outputs the sense read start pulse 8 according to the sense read shift clock 9 to sequentially put the first, second and 240-th X sensor line select switches 28, 29, and 30 in the ON state. As a result, the first to 240-th X sensor line outputs 33 to 35 parallelly issued are converted to a serial output, and then the serial output is issued as the X directional sensor output 31.

The display/sense controller 1 performs substantially the same operation as in the prior art with respect to the display operation. That is, in the sense duration, the display/sense controller outputs the sense line select start pulse 12 and the sense line select shift clock 13, and also outputs the sense sync backlight control signal 14 so as to turn OFF the backlight.

The backlight controller 63 generates the backlight turn-ON control signal 64 from the sense sync backlight control signal 14 to control the turning ON or OFF of the backlight, whereby the backlight unit 65 is put in the ON or OFF state according to the backlight turn-ON control signal 64.

The number of display pixels is set at 240×320 and the sensors have the same resolution in the present embodiment. However, the number of sensors may be reduced, for example, by arranging one sensor for 4 display pixels, and the sensor resolution is also not limited to the above example.

Further, when the backlight control is unnecessary as when pen input or touch input is made invalid, the backlight control can be controllably turned OFF in the display/sense controller 1.

The display/sense controller 1 may be arranged to detect the presence or absence of external light. In this case, the display/sense controller can switch between a backlight ON/OFF state control mode in the presence of the external light and a usual operational mode in which the backlight is always put in the ON state in the absence of the external light.

Light sensing operation will be explained by referring to FIGS. 2, 3, 4A, and 4B.

In FIG. 2, signals are sent from the first Y sensor select line 41, the second Y sensor select line 42, and the 320-th Y sensor select line 43 via the multi-input OR circuit 116, and the binary counter 117. When these signals cause the read select switch 70 to be turned ON and the sensor line reset switch 69 to be turned ON; the storage capacitance 72 is charged with the $Q_{sat}$ expressed by the equation (1). Thereafter, the read select switch 70 and the sensor line reset switch 69 are turned OFF.

When light hits the phototransistor 71, a current flows through the phototransistor and an electric charge accumulated in the storage capacitance 72 is discharged by an amount $\Delta Q$ expressed by the equation (2). Thereafter, when the read select switch 70 is again turned ON, a sensor line output voltage value through the charge amplifier 66 becomes $V_{out}$ expressed by the equation (3).

And turning ON of the sensor line reset switch 69 causes the storage capacitance 72 to be charged with the electric charge $Q_{sat}$ and the subsequent operations are repeated.

In the case of no light hitting of the phototransistor, the electric charge of the storage capacitance 72 is held. When the read select switch 70 is again turned ON, the sensor line output voltage through the charge amplifier 66 has a value $V_{outmax}$ expressed by the equation (4).

And when the sensor line reset switch 69 is turned ON, the storage capacitance 72 is charged with the electric charge $Q_{sat}$ and the subsequent operations are repeated. The presence or absence of light, that is, the presence or absence of a touch is detected on the basis of a difference between the sensor output voltages $V_{out}$ and $V_{outmax}$.

In FIG. 3, the timing when the read select switch 70 shown in FIG. 2 is selected is based on the first to 320-th sense line select signal waveforms 83 to 85. The first pulse in each of the waveforms, which becomes a timing pulse for sensor line reset, causes both of the sensor line reset switch 69 and the read select switch 70 to be turned ON. The second pulse, which becomes a read select pulse, causes the read select switch 70 to be turned ON. These two pulses are sequentially output within the touch sense duration 82 of one vertical period 74 other than the data display duration 77.

The then sensor output voltage is at the reset-time voltage level 89 ($Q_{sat}$) at the first pulse of each sense line select signal waveform or at the reset timing. The output voltage has the touch-time voltage change 101 shown in the touch-time voltage waveform 87 in the touch mode; whereas, the output voltage has the nontouch-time voltage change 100 shown in the nontouch-time voltage waveform 88 in the no touch mode. The voltage change is output at the second pulse of each sense line select signal waveform.

In FIGS. 4A and 4B, since the sensor holding its electric charge is present only on the horizontal line on which the touched sensor is present, a pulse is output in the second Y select line sensor output waveform 103 at a position indicative of the horizontal direction of the touch.

In this way, since the horizontal direction of the touch position is determined based on the waveform of the X directional sensor output 31 and the vertical direction of the touch position is determined based on the position of the sensor select line of outputting the select pulse at this time, the presence or absence of a touch or the touch position can be detected.

By using FIGS. 5 and 6, backlight control in the present embodiment will be explained. In FIG. 5, in the sense mode, the photo sensor 108 is in the shade 113 and the backlight is turned ON. In this case, the existence of the shade 113 cannot be recognized because the backlight 115 is incident on the photosensor.

In FIG. 6, on the other hand, since the backlight is turned OFF in the sense mode to produce the shade 113 and to cause no backlight to hit the photo sensor, the presence of the shade can be easily detected.

As has been explained in the present embodiment, since the data display duration and the sense duration are set and backlight is turned OFF in the sense duration, the influence of the backlight on the shade of the touched part when detected can be suppressed and a detection accuracy can be increased.

Embodiment 2

Explanation will next be made as to black display control when a pixel is a spontaneous light-emitting element such as an organic EL.

Figure 7:
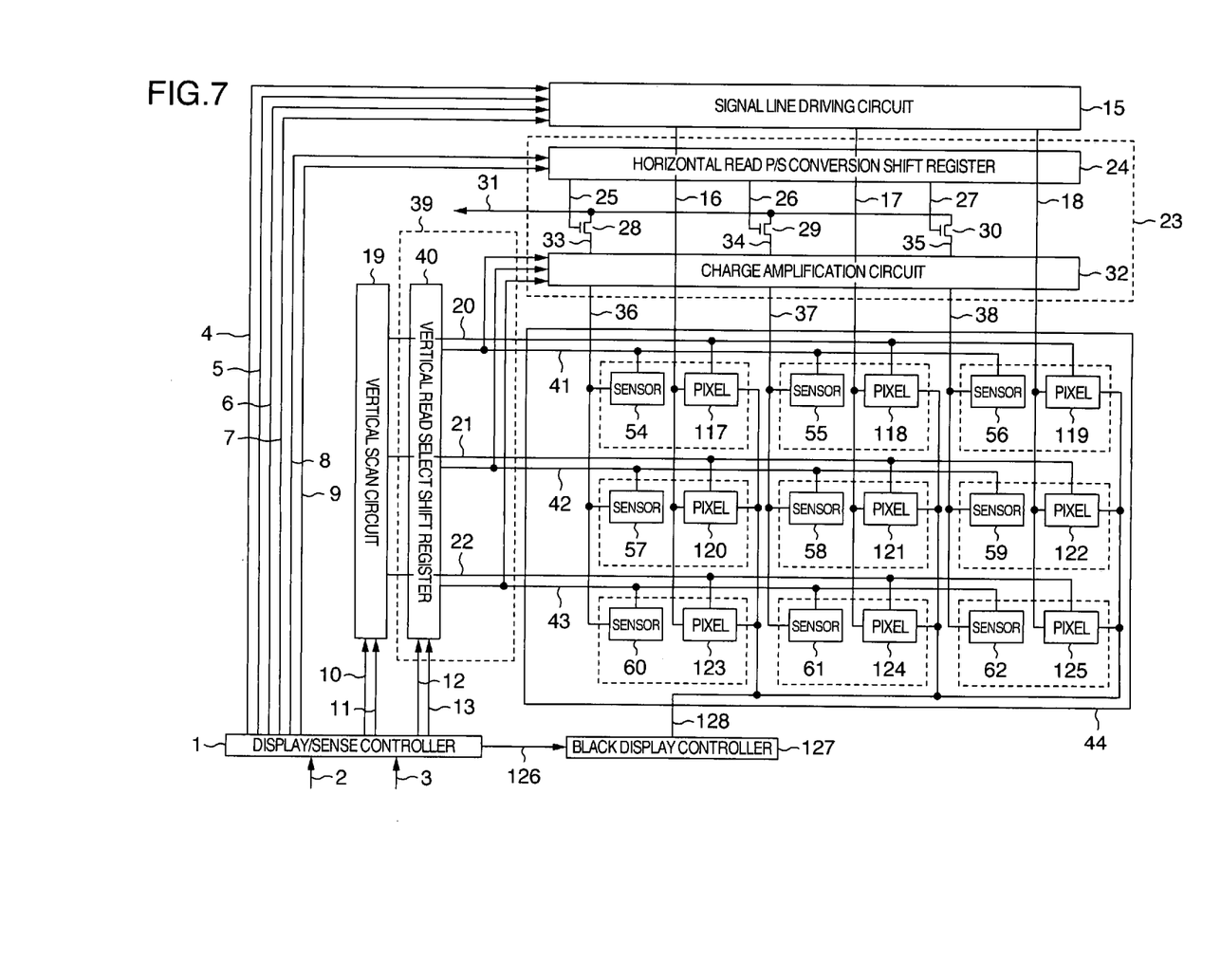
FIG. 7 schematically shows a display device with a touch screen based on black display control in accordance with a second embodiment of the present invention.

FIG. 7 corresponds to FIG. 1, except that the display pixels 45 to 53 are replaced with spontaneous light-emitting display pixels 117 to 125, the backlight unit 65 is removed, the sense sync backlight control signal 14 is replaced with a sense sync black display control signal 126, the backlight controller 63 is replaced with a black display controller 127, and the backlight turn-ON control signal 64 is replaced with a black display control signal 128. With respect to the output scan of the display image sensor line, the embodiment 2 is substantially the same as the embodiment 1.

The display/sense controller 1 performs display substantially the same operation as in the prior art. That is, in the sense mode, the display/sense controller outputs the sense line select start pulse 12 and the sense line select shift clock 13, and also outputs the sense sync black display control signal 126 so as to give black display of the spontaneous light-emitting display pixels.

Figure 8:
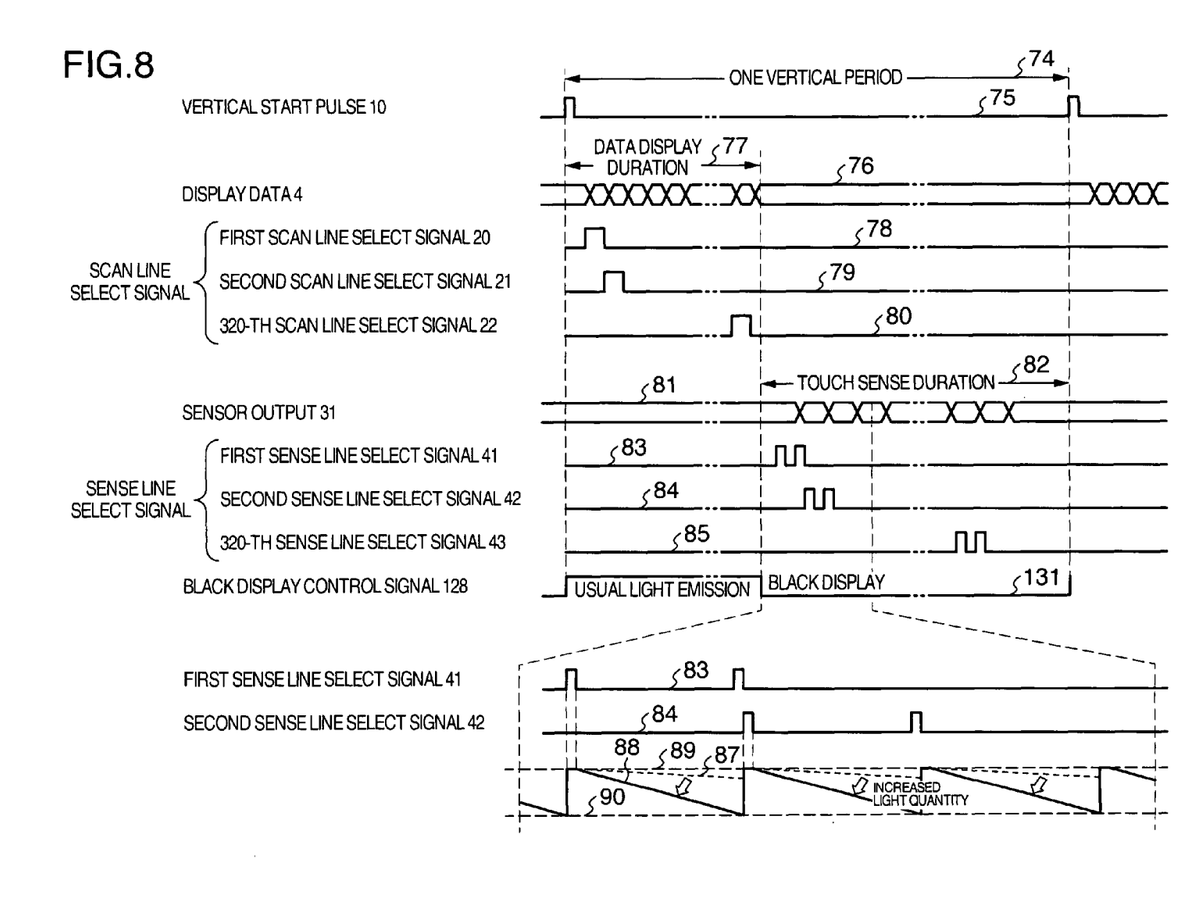
FIG. 8 is a timing chart showing the operations of control signals in the black display control of FIG. 7.

FIG. 8 is a timing chart showing the operations of control signals in the present embodiment. FIG. 8 is different from FIG. 3 in that the black display control signal 128 is controlled in the touch sense duration 82 so that the signal 128 is input to control terminals of transistors to drive the spontaneous light-emitting display pixels 117 to 125 and to give black display of the spontaneous light-emitting display pixels 117 to 125.

Figure 9:
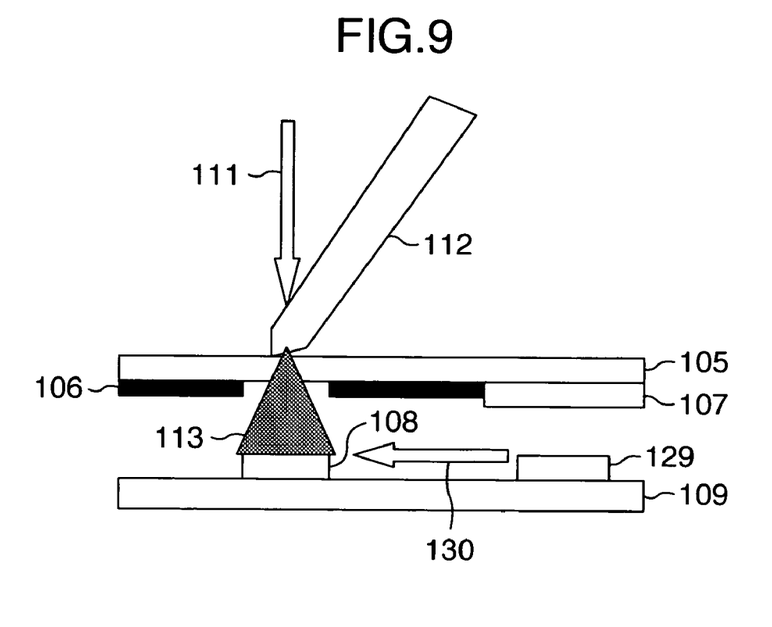
FIG. 9 shows a condition of data display duration in a touch mode in the black display control.

FIG. 9 shows the state of data display duration in a touch mode, wherein reference numeral 129 denotes a spontaneous light-emitting element and numeral 130 denotes light emitted from the spontaneous light-emitting element 129. Even when the photo sensor 108 receives a shade, the light 130 hits the photo sensor when the spontaneous light-emitting element is in the ON state.

Figure 10:
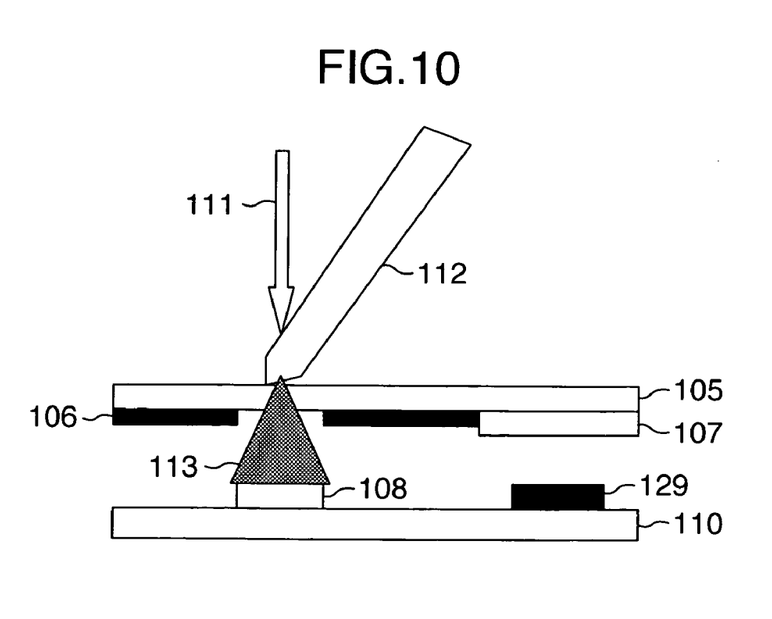
FIG. 10 shows a condition of sense duration in the touch mode in the black display control.

FIG. 10 shows the state of sense duration in the touch mode. The structure of FIG. 10 is substantially the same as that of FIG. 9, but different in that the spontaneous light-emitting element 129 is displayed in black in the sense duration so that no light from the spontaneous light-emitting element 129 hits the photo sensor 108 even when the sensor 108 is in the shade.

Explanation will be explained as to black display control in the present embodiment, by referring to FIGS. 9 and 10. The light sensing operation of the embodiment 2 is substantially the same as that of the embodiment 1.

In FIG. 9, the photo sensor 108 is in the shade 113 in the sense mode. Since the photo sensor does not receive light, the photo sensor part has to be detected as a touch part. However, the shade of the photo sensor is eliminated by the light 130 emitted from the spontaneous light-emitting element 129. That is, the shade is not recognized.

In FIG. 10, on the other hand, the spontaneous light-emitting element 129 is displayed in black in the sense mode. Since the shade 113 is produced and no light from the spontaneous light-emitting element 129 hits the shade, the shade can be easily detected.

As shown in the present embodiment, the data display duration and the sense duration are set, and the spontaneous light-emitting element is displayed in black in the sense duration. As a result, the influence of the light from the spontaneous light-emitting element on the shade of the touched part when detected can be suppressed and a detection accuracy can be increased.

Further, the display/sense controller 1 can detect the presence or absence of external light and can switch between a black display control mode in the presence of external light and an usual mode of no black display in the absence of external light.

In the present invention, the phototransistor is employed as a light detecting means. However, an element other than the phototransistor such as a diode or a photo IC may be used without limiting the structure of the sensor part.

The influence on the photo sensor is suppressed by backlight light-emitting control in the sense duration in a liquid crystal display and by the black display control of the spontaneous light-emitting element as the organic EL. However, even in a spontaneous light-emitting element other than the organic EL, the substantially the same effects can be clearly obtained by controlling the light emission in the sense duration, and the present invention is not limited to the backlight control and the black display control of the organic EL.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display device with a touch screen, comprising:
a display panel including a plurality of pixels arranged in a matrix, X signal lines for inputting a display signal to each of said pixels, and Y scan lines for inputting a scan line select signal to input said display signal to each of the pixels arranged on one horizontal line;
a plurality of sensors arranged in a matrix between said plurality of pixels arranged in the matrix;
X sensor lines for outputting an output of each of said sensors in a vertical direction;
Y sensor lines for outputting a sense line select signal to output said sense output from each of the sensors arranged on one horizontal line; and
a backlight unit located at the back side of said plurality of pixels arranged in the matrix;
wherein a display duration for displaying display data on said display panel and a sense duration for outputting a sense output from said sensor are provided, and said backlight unit is turned ON in said display duration and turned OFF in said sense duration;
wherein said display duration and said sense duration are included in one vertical period; and
wherein said sense line select signal in said sense duration includes two pulses, said sensor is reset by the first one of said two pulses, and said sense output is read out from said sensor by the second one of the two pulses.

* * * * *